(12) United States Patent
Wang et al.

(10) Patent No.: US 11,885,613 B2
(45) Date of Patent: Jan. 30, 2024

(54) DEPTH DATA MEASURING HEAD, MEASUREMENT DEVICE AND MEASURING METHOD

(71) Applicant: SHANGHAI PERCIPIO TECHNOLOGY LIMITED, Shanghai (CN)

(72) Inventors: Minjie Wang, Shanghai (CN); Yushi Liang, Shanghai (CN)

(73) Assignee: SHANGHAI PERCIPIO TECHNOLOGY LIMITED, Shanghai (CN)

( * ) Notice: Subject to any disclaimer, the term of this patent is extended or adjusted under 35 U.S.C. 154(b) by 195 days.

(21) Appl. No.: 17/437,512

(22) PCT Filed: Dec. 3, 2019

(86) PCT No.: PCT/CN2019/122667
§ 371 (c)(1),
(2) Date: Sep. 9, 2021

(87) PCT Pub. No.: WO2020/186825
PCT Pub. Date: Sep. 24, 2020

(65) Prior Publication Data
US 2022/0155059 A1 May 19, 2022

(30) Foreign Application Priority Data

Mar. 15, 2019 (CN) .......................... 201910199180.3
Apr. 23, 2019 (CN) .......................... 201910329849.6
(Continued)

(51) Int. Cl.
*G01B 11/25* (2006.01)
*G06T 7/521* (2017.01)
*G01B 11/22* (2006.01)

(52) U.S. Cl.
CPC .......... *G01B 11/2518* (2013.01); *G01B 11/22* (2013.01); *G06T 7/521* (2017.01)

(58) Field of Classification Search
CPC . G01B 11/2518; G01B 11/22; G01B 11/2545; G06T 7/521; H04N 13/239; H04N 13/296; H04N 2013/0081; H04N 13/254
(Continued)

(56) References Cited

U.S. PATENT DOCUMENTS 6,154,279 A    11/2000  Thayer
2013/0208157 A1  8/2013  Bechtel et al.
(Continued)

FOREIGN PATENT DOCUMENTS

CN    101009776 A    8/2007
CN    101072303 A    11/2007
(Continued)

*Primary Examiner* — Isiaka O Akanbi
(74) *Attorney, Agent, or Firm* — IPro, PLLC

(57) ABSTRACT

A depth data measuring head (300), a measurement device (1400) and a measurement method. The measuring head (300) comprises: a projection device (310, 1410) used to project and scan line coded structured light across a region to be photographed; first and second image sensors (310_1, 310_2, 1410_1, 1410_2) disposed at preset relative positions and used to photograph said region so as to respectively obtain first and second two-dimensional image frames under irradiation of the structured light; and a synchronization device (330, 1430) used to synchronously activate, on the basis of a scan position of the projection device, pixel columns of the first and second image sensors (310_1, 310_2, 1410_1, 1410_2) in a line direction corresponding to the current scan position to perform imaging.

14 Claims, 7 Drawing Sheets

(30) Foreign Application Priority Data

Apr. 29, 2019 (CN) .......................... 201910356663.X
May 13, 2019 (CN) .......................... 201910400277.6

(58) Field of Classification Search
USPC .................................................. 356/607–624
See application file for complete search history.

(56) References Cited

U.S. PATENT DOCUMENTS

| | | | |
|---|---|---|---|
| 2016/0307326 A1 | 10/2016 | Wang | |
| 2016/0341399 A1* | 11/2016 | Raz | ................... G06F 3/017 |
| 2017/0180654 A1* | 6/2017 | Swaminathan | ...... H04N 13/254 |
| 2017/0186146 A1* | 6/2017 | Raniwala | ................. H04N 5/33 |
| 2017/0186166 A1* | 6/2017 | Grunnet-Jepsen | ... H04N 13/239 |
| 2018/0176544 A1* | 6/2018 | Wang | ..................... G01B 11/22 |
| 2018/0348368 A1* | 12/2018 | Bronstein | ............... G01S 17/10 |
| 2018/0374230 A1 | 12/2018 | Narasimhan et al. | |
| 2019/0068951 A1 | 2/2019 | Mor et al. | |

FOREIGN PATENT DOCUMENTS

| | | |
|---|---|---|
| CN | 101455074 A | 6/2009 |
| CN | 102547159 A | 7/2012 |
| CN | 102595059 A | 7/2012 |
| CN | 105004282 A | 10/2015 |
| CN | 105427326 A | 3/2016 |
| CN | 205336464 U | 6/2016 |
| CN | 205987149 U | 2/2017 |
| CN | 106534632 A | 3/2017 |
| CN | 206321237 U | 7/2017 |
| CN | 107071289 A | 8/2017 |
| CN | 107369156 A | 11/2017 |
| CN | 107615752 A | 1/2018 |
| CN | 207184624 U | 4/2018 |
| CN | 108428244 A | 8/2018 |
| CN | 109314775 A | 2/2019 |
| CN | 109491074 A | 3/2019 |
| JP | H07270518 A | 10/1995 |
| JP | H09325019 A | 12/1997 |
| JP | H10300443 A | 11/1998 |
| JP | 2001116526 A | 4/2001 |
| JP | 2002039716 A | 2/2002 |
| JP | 2015056902 A | 3/2015 |
| JP | 2017521660 A | 8/2017 |
| JP | 2018146521 A | 9/2018 |
| WO | 2011031538 A3 | 6/2011 |

* cited by examiner

DEPTH DATA MEASURING HEAD, MEASUREMENT DEVICE AND MEASURING METHOD

TECHNICAL FIELD

The disclosure herein relates to the field of three-dimensional detection technology, and in particular, to depth data measuring head, measurement device and measuring method.

BACKGROUND

A depth camera is an acquisition device that acquires the depth information of a target object. This type of camera is widely used in three-dimensional scanning, three-dimensional modeling and other fields. For example, more and more smart phones are equipped with depth camera system for face recognition. Although three-dimensional imaging has been a hot research topic in the field for many years, the existing depth cameras still have many problems such as high power consumption, large size, poor anti-interference ability, and cannot achieve pixel-level or even sub-pixel-level real-time imaging.

Therefore, there is a need for improved depth data measurement scheme.

SUMMARY

In view of this, the disclosure proposes a depth data measuring head and a measurement system, which combine actively projected strip-coded structured light and binocular imaging, and rely on the superimposable characteristics of strip-coded patterns and the characteristics of binocular imaging that do not depend on a specific imaging plane, and provides a highly flexible pixel-level depth imaging solution. The disclosure also removes the influence of ambient light on the depth measurement result through the high synchronization of imaging and scanning, thereby further expanding the available scenes of the disclosure.

According to one aspect of the disclosure, a depth data measuring head is provided, which includes: a projection device for projecting strip-coded structured light in a scanning manner to the capture area; first and second image sensors having a predetermined relative positional relationship, for photographing the capture area to obtain the first and second two-dimensional image frames illuminated by the structured light respectively; and a synchronization device for synchronously turning on the pixel columns in the strip direction corresponding to the current scanning position in the first and second image sensors for imaging, based on the scanning position of the projection device. In the alternative, the synchronization device can also control the scanning position of the projection device for synchronization with the imaging of the image sensor. As a result, the one-dimensional characteristics of the strip image are used to control the range of the pixel column for imaging at each moment, thereby reducing the adverse effect of ambient light on the measurement result.

According to another aspect of the disclosure, a depth data measurement device is provided, which includes: the depth data measuring head as described in any one of the above, and a processor connected to the depth data measuring head, and is configured to determine the depth data of the capture object in the capture area according to the predetermined relative positions of the first and second image sensors and the first and second two-dimensional image frames obtained by imaging the structured light. Preferably, at least part of the synchronization function of the synchronization device is implemented by the processor.

According to another aspect of the disclosure, a depth data measuring method is provided, which includes: projecting strip-coded structured light in a scanning manner to the capture area; using the first and second image sensors having a predetermined relative positional relationship to photograph the capture area to obtain the first and second two-dimensional image frames illuminated by the structured light, respectively, wherein, based on the scanning position of the structured light strip, synchronously turning on the pixel columns in the strip direction corresponding to the current scanning position in the first and second image sensors; and obtaining the depth data of the object to be measured in the capture area, based on the first and second two-dimensional image frames. In the alternative, the scanning position of the projection device can be controlled to synchronize with the imaging of the image sensor.

The depth data measurement scheme of the disclosure can combine actively projected strip-coded structured light and binocular imaging, and rely on the superimposable characteristics of strip-coded patterns and the characteristics of binocular imaging that do not depend on a specific imaging plane, and thus provides a highly flexible pixel-level depth imaging solution. Specifically, the disclosure can also remove the influence of ambient light on the depth measurement results through the high synchronization of imaging and scanning, and use DMD to achieve high-speed scanning of line-shaped light, thereby further expanding the available scenes of the disclosure and improving imaging speed and accuracy.

BRIEF DESCRIPTION OF FIGURES

Through a more detailed description of the exemplary embodiments of the present disclosure in conjunction with the accompanying drawings, the above and other objectives, features, and advantages of the present disclosure will be more apparent. In the exemplary embodiments of the present disclosure, the same reference numerals generally represent the same parts.

DETAILED DESCRIPTION

Hereinafter, preferred embodiments of the present disclosure will be described in more detail with reference to the accompanying drawings. Although the drawings illustrate the preferred embodiments of the present disclosure, it should be understood that the disclosure may be implemented in various forms and should not be limited to the embodiments set forth herein. Rather, these embodiments are provided so that this disclosure will be thorough and complete, and will fully convey the scope of the disclosure to those skilled in the art.

In order to meet the requirements of high precision, high frame rate, low power consumption and miniaturization in the field of three-dimensional imaging, the disclosure proposes a depth data measuring head and a measurement system, which combine actively projected strip-coded structured light and binocular imaging, and rely on the superimposable characteristics of strip-coded patterns and the characteristics of binocular imaging that do not depend on a specific imaging plane, and provides a highly flexible pixel-level depth imaging solution. The disclosure also removes the influence of ambient light on the depth measurement result through the high synchronization of imaging and scanning, thereby further expanding the available scenes of the disclosure.

Figure 1:
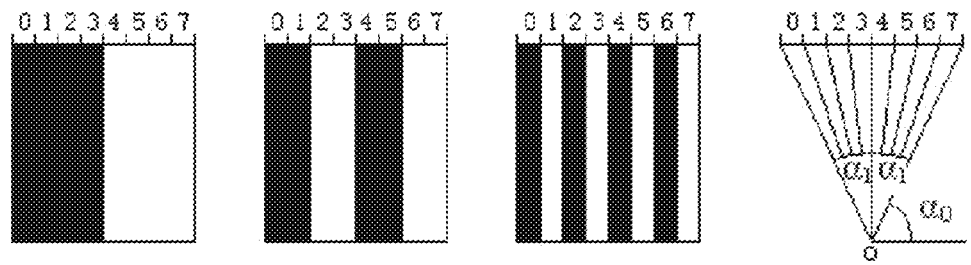
FIG. 1 shows the principle of depth imaging using strip-coded structured light.

According to the structured light measurement principle, it can be known that whether the scanning angle a can be accurately determined is the key to the entire measurement system. In the case of dot-shaped or line-shaped structured light, the scanning angle can be calculated and determined by mechanical devices such as rotating mirrors. The meaning of image encoding and decoding is to determine the scanning angle of encoded structured light, that is, the scanning angle of plane-shaped structured light system. FIG. 1 shows the principle of depth imaging using strip-coded structured light. In order to facilitate understanding, the figure briefly illustrates the coding principle of striped structured light with two-gray-level and three-binary time codes. The projection device can sequentially project three patterns as shown in the figure on the object to be measured in the capture area, and in this three patterns, the projection space is divided into 8 areas with bright and dark two gray levels. Each area corresponds to its own projection angle, where it can be assumed that the bright area corresponds to the code "1" and the dark area corresponds to the code "0". Combine the coding values of a point on the scene in the projection space in the three coding patterns according to the projection order to obtain the area code value of the point, thereby determining the area where the point is located, and then decoding to obtain the scanning angle of the point.

Figure 2:
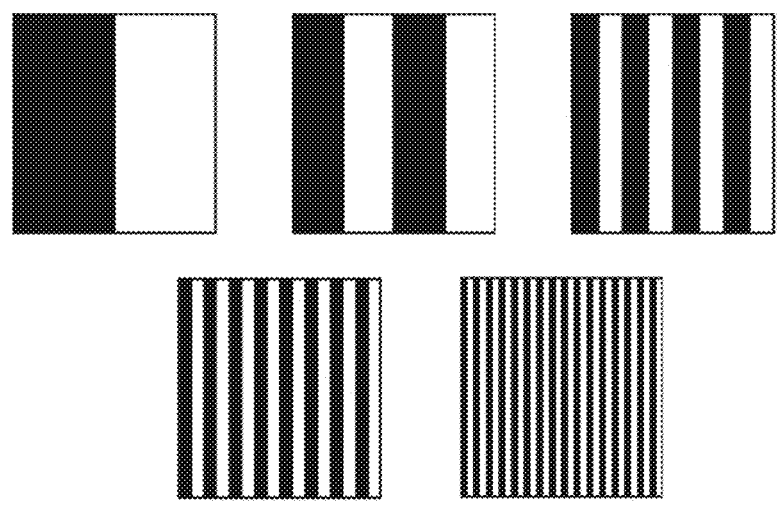
FIG. 2 shows another example of projecting strip-coded structured light.

In the binocular imaging system, the above-mentioned decoding process can be simplified by directly matching the coded values of each point in the first and second image sensors. In order to improve the matching accuracy, the number of projected patterns in the time coding can be increased. FIG. 2 shows another example of projecting strip-coded structured light. Specifically, the figure shows a five-bit binary time code with two gray levels. In the application scenario of binocular imaging, this means that, for example, each pixel in each of the left and right image frames contains 5 area code values of 0 or 1, and as a result, the left and right images can be matched with higher accuracy (for example, at the pixel level). When the projection rate of the projection device is unchanged, compared with the three coding patterns in FIG. 1, the example in FIG. 2 is equivalent to achieving higher precision image matching at a higher time-domain cost. This is still quite desirable when the original projection rate of the projection device is extremely high (for example, the micromirror device preferably used in the disclosure).

Figure 3:
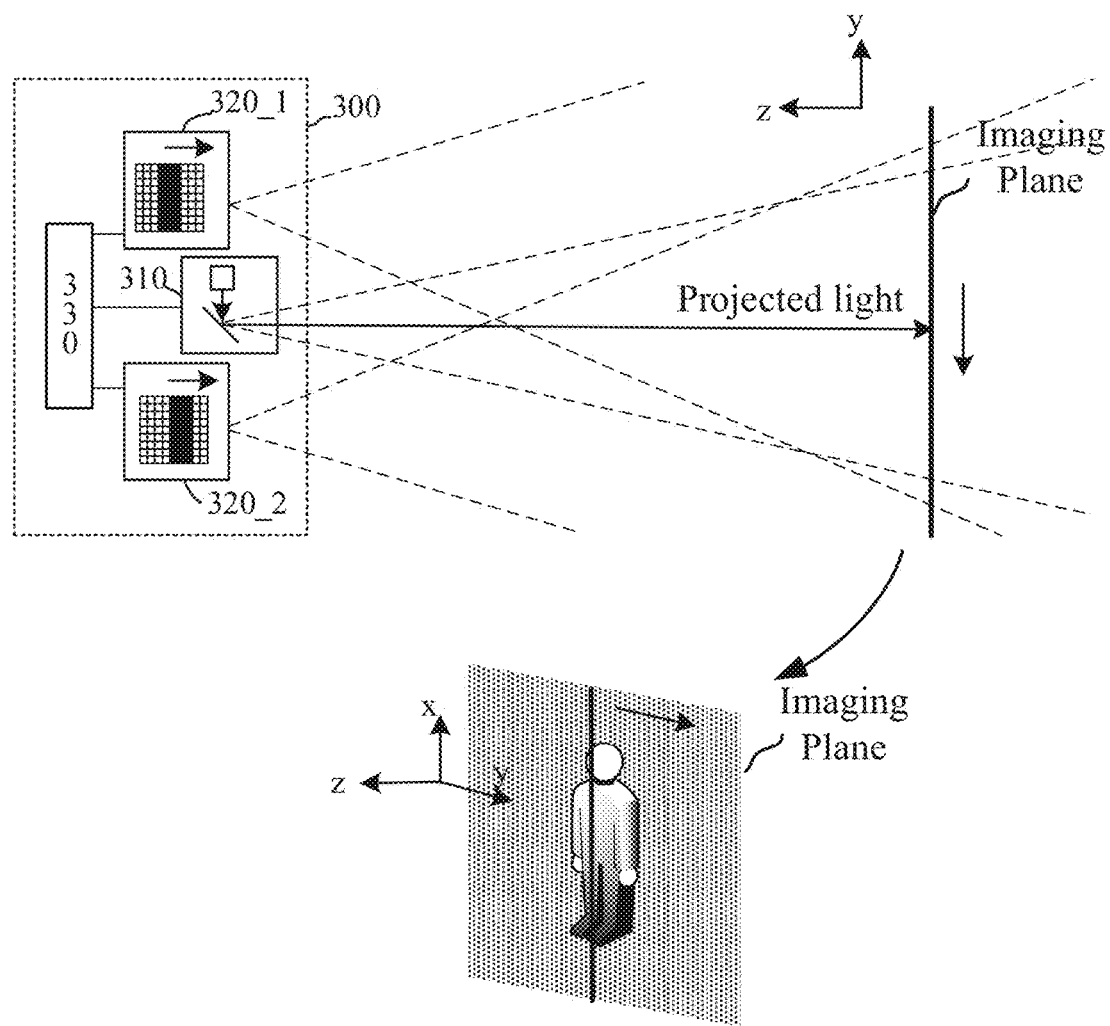
FIG. 3 shows a schematic diagram of the configuration of a depth data measuring head according to an embodiment of the disclosure.

FIG. 3 shows a schematic diagram of the configuration of a depth data measuring head according to an embodiment of the disclosure. As shown in FIG. 3, the depth data measuring head 300 includes a projection device 310 and two image sensors 320_1 and 320_2.

The projection device 310 is configured to project structured light with strip codes to the capture area in a scanning manner. For example, during three successive image frame projection periods, the projection device 310 can successively project one of the three patterns as shown in FIG. 1, and the imaging results of these three patterns can be used for generating depth data. 320_1 and 320_2, which can be called the first and second image sensors, respectively, have a predetermined relative position relationship, and are configured to image the capture area to obtain the first and second two-dimensional image frames illuminated by structured light, respectively. For example, in the case where the projection device 310 projects the three patterns as shown in FIG. 1, the first and second image sensors can respectively image the capture area projected with the three patterns (for example, the imaging plane in FIG. 3 and the area within a certain range before and after it) in three synchronized image frame imaging periods.

As shown in FIG. 3, the projection device 310 may project line-shaped light (which extends in the x direction) in the z direction (i.e., toward the capture area). In different embodiments, the projection of the above-mentioned line-shaped light can be already shaped (that is, the emitted light itself is light in a linear shape), or it can be a light spot that moves in the x direction (that is, the line-shaped light obtained by scanning). The projected line-shaped light can move continuously in the y direction to cover the entire imaging area. The perspective view of the capture area in the lower part of FIG. 3 gives a more understandable illustration of the line-shaped light scanning.

In the embodiments of the disclosure, the direction in which the light exits the measuring head is agreed to be the z direction, the vertical direction of the imaging plane is the x direction, and the horizontal direction is the y direction. Therefore, the striped structured light projected by the projection device may be the result of the line-shaped light which extends in the x direction moving in the y direction. Although in other embodiments, it is also possible to perform synchronization and imaging processing on the striped structured light obtained by moving the line-shaped light (which extends in the horizontal y direction) in the x direction, it is still preferable to use vertical striped light for description in the embodiments of the disclosure.

Furthermore, the measuring head 300 further includes a synchronization device 330. The synchronization device 330 is respectively connected with the projection device 310 and the first and second image sensors 320_1 and 320_2 to achieve precise synchronization between the three. Specifically, based on the scanning position of the projection device 310, the synchronization device 330 may synchronously turn on the pixel column(s) in the strip direction corresponding to the current scanning position in the first and second image sensors 320_1 and 320_2 for imaging. FIG. 3 shows the current strip being scanned to the center position of the capture area. Correspondingly, in the image sensors 320_1 and 320_2, the pixel columns (for example, 3 adjacent pixel columns) located in the central area are turned on for imaging. As the strips move in the y direction (as shown by the arrow in the lower perspective view of FIG. 3), the pixel columns that are turned on for imaging in the image sensors 320_1 and 320_2 also move synchronously (as shown by the arrow above the matrix in the upper left block diagram of FIG. 3). As a result, the one-dimensional characteristics of the strip image can be used to control the range of the pixel columns for imaging at each moment, thereby reducing the adverse effect of ambient light on the measurement result. In order to further reduce the influence of ambient light, the projection device is particularly suitable for projecting light that is not easily confused with ambient light, such as infrared light. In addition, since the corresponding relationship between the pixel column(s) and the scanning light is affected by many factors such as the width, power, speed of the projected light, and the photosensitive efficiency of the image sensor, the range (and corresponding number) of the pixel columns that are simultaneously turned on each time can be determined based on, for example, the calibration operation.

Figure 4A:
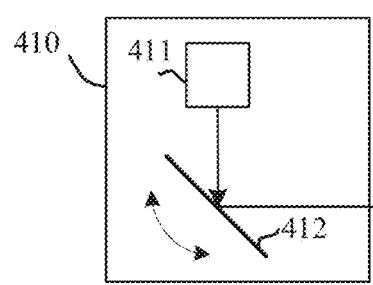
FIGS. 4A-B show enlarged views of the operation example of the projection device shown in FIG. 3.
Figure 4B:
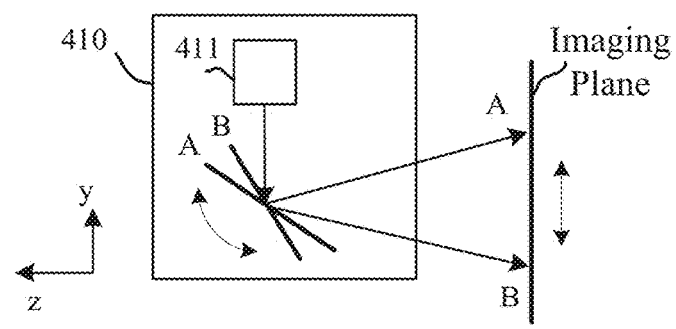

FIGS. 4A-B show enlarged views of the operation example of the projection device shown in FIG. 3. Specifically, as shown in FIG. 3, in the projection device 310, the laser light emitted by a laser generator (such as the laser generator 411 shown in detail in FIGS. 4A-B) passes through a projection mechanism (such as the projection mechanism 412 shown in detail in FIGS. 4A-B) and is projected to the capture area in a scanning manner (the grey area in FIG. 3), so as to actively perform structured light projection on the object to be measured in the capture area (for example, the person in FIG. 3). A pair of image sensors 320_1 and 320_2 images the capture area, thereby capturing image frames required for depth data calculation. As shown in FIG. 3, the dashed lines emitted by the projection device 310 are used to indicate its projection range, and the dashed lines emitted by the image sensors 320_1 and 320_2 are used to indicate their respective imaging ranges. The capture area is usually located in the overlapping area of the three projection and imaging ranges.

In practical applications, the laser generator is configured to generate line-shaped and/or infrared lasers, and the laser generator performs high-speed switching to project bright and dark structured light corresponding to the strip code in a scanning manner. High-speed switching can include high-speed switching of the laser generator and high-speed encoding switching.

In one embodiment, the laser generator can continuously emit laser light with the same intensity, and the projected strip pattern is realized by turning on and off the laser generator. In this case, since the laser generator only projects light of one intensity, each pixel of the image sensor only needs to record the "presence or absence" of light, so the equipped image sensor can be a black and white image sensor.

In another embodiment, the laser generator itself can emit laser light with varying light intensity, for example, the laser light having a sinusoidal transformation according to the applied power. The above-mentioned sine-transformed laser can be combined with strip projection, thereby projecting pattern(s) with alternating bright and dark strips in a scanning manner, which has different brightness between bright strips. In this case, the image sensor needs to have the ability to perform differential imaging of different light intensities, so it can be a multi-level grayscale image sensor. Obviously, grayscale projection and imaging can provide more accurate pixel matching than black and white projection and imaging, thereby improving the accuracy of depth data measurement.

In one embodiment, the laser generator 411 may be a line-shaped laser generator, which generates line-shaped light extending in the x direction (direction perpendicular to the paper surface in FIGS. 4A-B). The line-shaped light is then projected to the imaging plane by a reflection mechanism 412 that can swing along an axis in the x-direction. The swing diagram of the reflection mechanism 412 is shown in FIG. 4B. As a result, it is possible to perform reciprocating line-shaped light scanning in the A-B range of the imaging plane.

Figure 5:
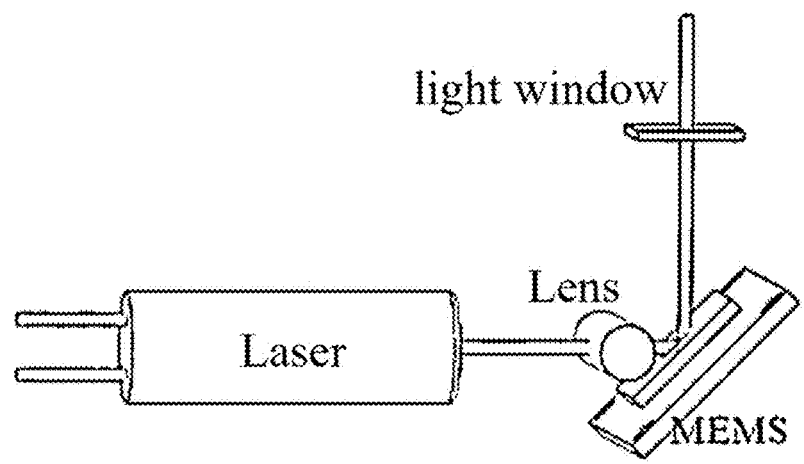
FIG. 5 shows a simplified schematic perspective view of the projection device used in the disclosure.

In one embodiment, the above-mentioned reflection mechanism 412 may be a micromirror device (also may be referred to as a Digital Micromirror Device, DMD), and may be implemented as a MEMS (Micro Electro Mechanical System). FIG. 5 shows a simplified schematic perspective view of the projection device used in the disclosure. As shown in FIG. 5, the spot laser light generated by the laser can obtain line-shaped light through a lens (corresponding to the line-shaped laser generator 411 in FIG. 4). The line-shaped light is then reflected by a micromirror device in the form of MEMS. The light is then projected to the outside space through the light window. Micromirror devices have extremely high performance. For example, the commercially available DMD can perform highly stable reciprocating vibrations at a frequency of 2 k, thereby laying the foundation for high-performance depth imaging.

In other embodiments, laser light projected in a scanning manner may also be a spot laser light, so the projection mechanism needs to correspondingly change the projection direction in the two-dimensional direction (in the two directions of x and y in the figure). For example, the projection mechanism first scans the striped light in the x direction, then performs displacement in the y direction, and continues to scan in the x direction at different y positions.

In one embodiment, the pixel columns of the first image sensor 320_1 and the second image sensor 320_2 may be turned on respectively to correspond to the current scanning position. In other words, taking into account the parallax between the two sensors, the pixel columns of the first image sensor 320_1 and the second image sensor 320_2 may be different, but both can be synchronized with the scanning position under the control of the synchronization device.

For example, in the case where the image sensor has 1000×1000 pixels, the first and second image sensors have 250 pixel parallax, and the projection device is installed between the two sensors, for the line-shaped light currently projected to the center of the capture area, the first image sensor 320_1 can turn on the 300-375th pixel column, and the second image sensor 320_2 turns on the 625-700th pixel column. The pixel columns each turned on by the two image sensors can image the currently projected strip in their respective imaging fields of view.

In the above example, the two image sensors can turn on 75 pixel columns at each moment (that is, the imaging window has a width of 75 pixels), and the imaging window moves with the movement of the scan light. In the example of FIG. 1, the imaging window of the image sensor can move along with the movement of the line-shaped light in the y direction to ensure the imaging of the strip light. It should be understood that the narrower the imaging window (the closer it is to the imaging width of the strip light itself), the greater the degree of filtering of ambient light and the higher the signal-to-noise ratio of the imaging frame. However, since the distance between the subject and the measuring head (i.e., the distance in the z direction) will vary within a certain range, and considering that the calibration step cannot be completely accurately achieved, it is necessary to leave a certain degree of redundancy for the imaging window. In other words, the wider the imaging window, the less likely it is that the current projected light falls outside the range of the imaging window and cannot be imaged, but the signal-to-noise ratio of the imaging frame will be relatively low. Therefore, the width of the imaging window can be appropriately selected based on the trade-off between ease of operation, redundancy, and image signal-to-noise ratio.

As shown in FIG. 3, the current strip is scanning to the center of the capture area. For this reason, in the image sensors 320_1 and 320_2, the pixel columns (for example, 3 adjacent pixel columns) located in the central area are turned on for imaging. As the strips move in the y direction (as shown by the arrow in the lower perspective view of FIG. 3), the pixel columns that are turned on for imaging in the image sensors 320_1 and 320_2 also move synchronously (as shown by the arrow above the matrix in the upper left block diagram of FIG. 3). As a result, the one-dimensional characteristics of the strip image can be used to control the range of the pixel column(s) for imaging at each moment, thereby reducing the adverse effect of ambient light on the measurement result. In order to further reduce the influence of ambient light, the projection device is particularly suitable for projecting light that is not easily confused with ambient light, such as infrared light. In addition, since the corresponding relationship between the pixel column(s) and the scan light is affected by many factors such as the width, power, speed of the projected light, and the photosensitive efficiency of the image sensor, the range (and corresponding number) of the pixel columns that are simultaneously turned on each time can be determined based on, for example, the calibration operation.

Figure 6:
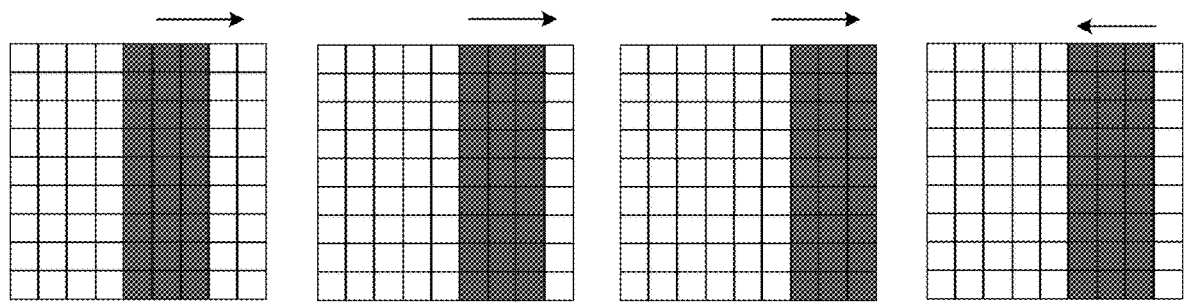
FIG. 6 shows a schematic diagram of the pixel rows in the image sensor being turned on in turn.

Whether it is direct projection of strip light that moves in they direction, or spot light that needs to be moved in the x direction to form strip and displaced in the y direction, what appears on the capture area is a strip that moves in the y direction over time. As the light spot moves in the y direction, the specific pixel column(s) of all pixels used to record the image frame on the image sensor is turned on, so that it can collect the light reflected back from the corresponding position. FIG. 6 shows a schematic diagram of the pixel columns in the image sensor being turned on in turn. As shown in FIG. 6, when the strip projected by the projection device moves from the middle of the imaging area to one side, in the pixel array of the image sensor, the pixel columns turned on for imaging also move from the middle to one side. As a result, the pixel columns are only imaged and recorded during the period when the corresponding capture area is scanned, and is not recorded during other periods. Since the intensity of the projected laser light is higher than the intensity of the ambient light, the structured light itself can be imaged extremely accurately when the ambient light cannot be accumulated under the synchronous opening scheme of the disclosure. Since conventional image sensors usually perform row exposure, the image sensor used in the disclosure for column-by-column (or multiple columns at the same time) exposure can be obtained by rotating the existing image sensor by 90°. After being rotated, it is also necessary to add an entire column of simultaneous exposure control to the image sensor.

It should be understood that the pixel matrices shown in FIG. 3 and FIG. 6 are only examples given to illustrate the synchronization principle of the disclosure. In practical applications, the pixel matrix of an image sensor often has a higher magnitude (for example, 1000×1000), and the pixel columns that are turned on at the same time each time can also have a different range according to the calibration (for example, turn on 3 columns each time, or turn on different numbers of columns for different positions of the capture area, etc.). In addition, the opening of the pixel column in the image sensor may only be related to the scanning position of the projection structure in the projection device, and has nothing to do with whether the current strip light is actually projected. In other words, the closing and opening of the laser emitter based on the distribution of the bright and dark strips of the projection structure will not affect the scan and projection action of the projection structure, nor will it affect the opening action of the image sensor pixel array synchronized with the scan and projection action described above.

The above projection device may include a micro-mirror device (DMD) that reciprocally vibrates at a predetermined frequency for projecting a line-shaped laser light to the capture area in a scanning manner at a predetermined frequency. Since the vibration frequency of the micromirror device is extremely high, for example, 2 k per second, which is equivalent to sweeping out a complete projected structured light pattern in 250 ns, it is necessary to synchronize the position of the light reflected by the micromirror device extremely accurately. The above accuracy makes it impossible to directly use the start signal of the micromirror device for synchronization (because the delay is not reliable), and therefore, considering the characteristics of the phase vibration of the micromirror device, a measurement instrument for real-time measurement of the vibration phase of the micromirror device can be included in the synchronization device, and based on the measurement result of the measurement instrument, synchronizes the turn on of the pixel column imaging. This ensures the synchronization of scanning and imaging at extremely high frequencies.

In one embodiment, the above-mentioned measurement may be based on the emitted light itself. Thus, the above-mentioned measurement instrument may be one or more photoelectric sensors (for example, two photodiodes (PDs)), and the two photoelectric sensors are arranged in any of the following ways: arranged on different exit paths of the projection device; arranged on different reflection paths in the projection device; and respectively arranged on the exit and reflection paths inside and outside the projection device. The arrangement of the photoelectric sensor can be reasonably selected so that it does not affect the normal projection of the structured light while accurately measuring the phase. As shown in FIG. 5, the PDs can be installed in the projection device, and the instantaneous vibration phase can be determined by measuring the reflection angle when the laser exits the light window. Since the vibration phase of the DMD is sinusoidally distributed, one PD can determine the sinusoidal distribution information, and more PDs help to measure the phase more accurately. In other embodiments, the PD may also be installed outside the projection device, for example, installed on the light window, for example, close to the edge of the light window to prevent the influence on the projection in the capture area. In other embodiments, other methods may be used to perform phase measurement, for example, capacitance measurement.

In one embodiment, each image sensor completes imaging of one image frame after each projection in a scanning manner of the projection device. For example, after the DMD completes half a period of vibration to scan the striped light in the x direction from one side of the capture area to the other, it completes the imaging of an image frame (for example, a pattern in FIG. 1 or FIG. 2). When the projection power of the projection device is limited, or the object to be measured is far away from the measuring head, the amount of charge acquired by the image sensor after a single scan cannot usually be imaged, and multiple imaging scans are required. Therefore, each image sensor completes the imaging of an image frame after each predetermined number of scanning projections performed by the projection device. For example, the DMD can scan the same structured light pattern in 5 consecutive vibrating periods, so that the image sensors can acquire a sufficient amount of charge for imaging, and then scan the same next structured light pattern in the next 5 vibrating periods, and so on.

Although FIG. 5 shows a DMD used as a reflecting device. However, in other embodiments, the reflecting device may be a mechanical rotating mirror that reciprocates at a predetermined frequency for scanning projection the line-shaped light generated by the laser generator to the capture area at the predetermined frequency. Correspondingly, the measurement instrument included in the synchronization device may be an angle measurer for real-time measurement of the rotation angle of the motor of the reflecting device. The synchronizing device can then perform synchronous turn on of the pixel column imaging based on the measurement result of the angle measurer.

In the above embodiment, the synchronization between the scanning strip and the exposure of the column pixels is achieved by controlling the exposure of the image sensor. This can be used when the light source scanning is controllable (for example, voltage and current can be used to control the angle and speed of the mechanical rotating mirror), but especially suitable for the phase and speed of the light source scanning is not controllable (for example, for micro-mirror devices) condition. Therefore, the micro-mirror device can detect the angle by PD or the capacitor respectively, and the mechanical rotating mirror can also realize the position detection through voltage detection or photoelectric coding.

Figure 7:
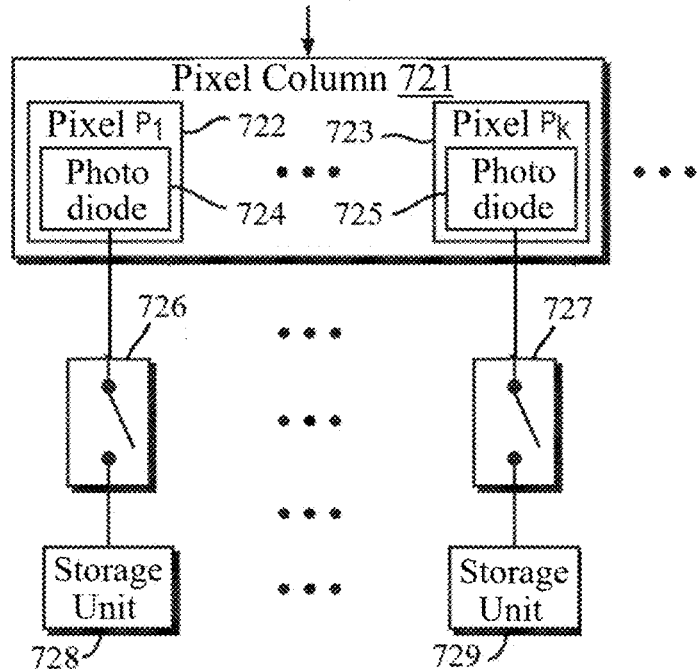
FIG. 7 shows an example of the pixel structure of the image sensor used in the disclosure.

Specifically, each pixel in the image sensor may include a structured light image frame storage unit that is turned on synchronously when corresponding to the current scanning position. FIG. 7 shows an example of the pixel structure of the image sensor used in the disclosure. As shown in FIG. 7, one pixel column 721 may include k pixels P1-Pk. Each pixel includes the same structure, that is, a photosensitive unit, a switch, and a storage unit. Specifically, the pixel P1 722 may include a photodiode 724 serving as a photosensitive unit, a switch 726, and a storage unit 728. The pixel Pk 723 may include a photodiode 725 serving as a photosensitive unit, a switch 727, and a storage unit 729. The storage unit is, for example, a unit for storing charge generated by the photodiode based on received light and outputting at 0 or 1 based on the amount of charge storage. Therefore, when the synchronizing device determines that pixel column(s) in a certain area of the image sensor needs to be turned on based on the measurement result of the measurement instrument, the synchronizing device turns on the switch of each pixel in the corresponding pixel column 721, so that the charge converted by photodiode can be stored in the storage unit; at other times, the charge accumulation switch of the pixel is turned off, so that the structured light image frame storage unit of each pixel is not turned on during most of an imaging frame, which can minimize the influence of ambient light.

Figure 8:
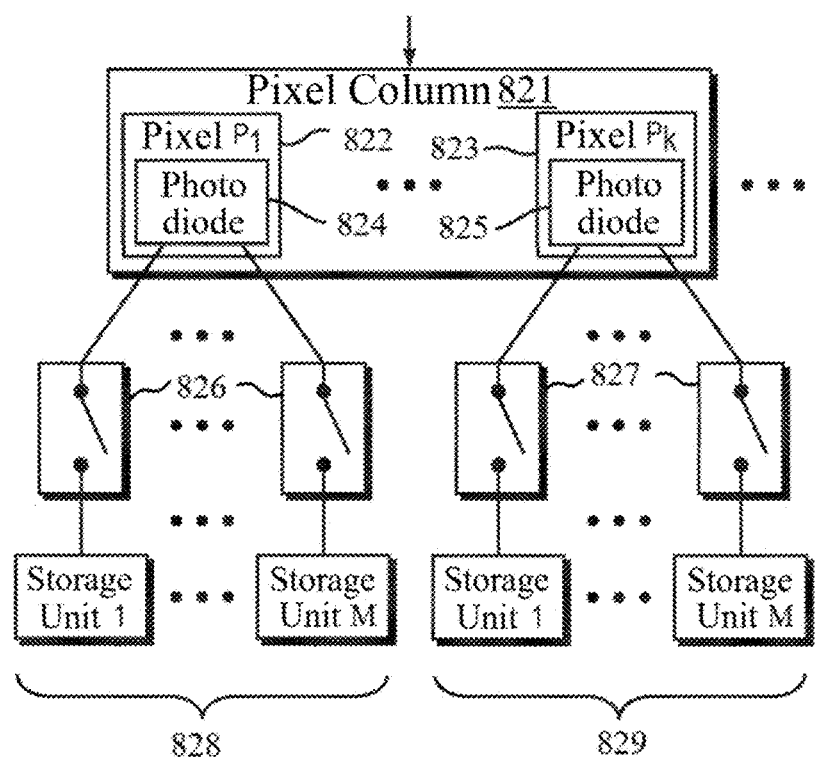
FIG. 8 shows another example of the pixel structure of the image sensor used in the disclosure.

In a preferred embodiment, each pixel in image sensor includes a plurality of such structured light image frame storage units. FIG. 8 shows another example of the pixel structure of the image sensor used in the disclosure. As shown in FIG. 8, one pixel column 821 may include k pixels P1-Pk. Each pixel includes the same structure, that is, one photosensitive unit, M switches, and M storage units, where each switch correspondingly controls the charge storage of one storage unit. Specifically, the pixel P1 822 may include a photodiode 824 serving as a photosensitive unit, M switches 826, and M storage units 828. The pixel Pk 823 may include a photodiode 825 serving as a photosensitive unit, M switches 827, and M storage units 829.

The storage unit is, for example, a unit for storing charge generated by the photodiode based on received light and outputting at 0 or 1 based on the amount of charge storage. Each structured light image frame storage unit is respectively used for imaging the strip-coded structured light of a different pattern sequentially projected by the projection device to generate a set of image frames for different patterns. This set of image frames can be used as a whole to perform one time depth data calculation.

Taking the image frames with five patterns as a group in FIG. 2 as an example, the projection device first projects the first pattern on the leftmost side in FIG. 2. During the pattern scanning process of the image sensor, the first group of switch and the storage unit in the corresponding pixel column 821 are sequentially turned on. Subsequently, the projection device projects the second pattern from the left in FIG. 2. During the pattern scanning process of the image sensor, the second group of switch and the storage unit in the corresponding pixel column 821 are sequentially turned on. Subsequently, the projection device projects the middle frame pattern in FIG. 2. During the pattern scanning process of the image sensor, the third group of switch and storage units in the corresponding pixel column 821 are sequentially turned on. Subsequently, the projection device projects the second pattern from the right in FIG. 2. During the pattern scanning process of the image sensor, the fourth group of switch and the storage unit in the corresponding pixel column 821 are sequentially turned on. Finally, the projection device projects the first pattern on the most right side of FIG. 2. During the pattern scanning process of the image sensor, the fifth group of switch and the storage unit in the corresponding pixel column 821 are sequentially turned on. As a result, imaging of image frames for a set of five patterns is completed. At this time, the value of 0 or 1 is stored in the five storage units of each pixel. Therefore, based on the five-value value of each pixel, the pixel matching in the two image sensors can be directly performed through the equipped digital arithmetic module, for example, pixel-level matching. In other words, when each pixel of the image sensor is equipped with multiple storage units, the virtual image signal can be directly converted into a digital signal to directly perform processing such as addition, subtraction, multiplication, and division on the digital arithmetic module to perform the pixel matching between the images. Compared with the prior art in which image frames need to be read frame by frame, and then the processor performs pixel matching software calculations, the digital computing solution of the present application can greatly increase the speed of image processing, and thereby improve the depth data generation rate.

In a preferred embodiment, the storage unit may be a storage unit capable of storing multi-level grayscale values. Correspondingly, the laser generator can project strip light whose intensity changes according to a certain rule, so that the storage unit can perform gray-scale imaging on it. By selecting a specific projection mode of light intensity change, combining the image sensor with multiple storage units and the front-end digital computing module, high pixel matching based on digital operation under grayscale imaging can be realized, thereby ensuring high-speed depth data calculation while further improving Image clarity.

In order to image ambient light (for example, different two-dimensional imaging), each pixel in the image sensor also includes an additional storage unit. The additional storage unit is turned off when at least one structured light image frame storage unit of the pixel is turned on, and is turned on during at least a part of the period when the structured light is not irradiated, so that the image sensor generates an ambient light image frame based on those additional storage units.

As a replacement or addition to the solution of a pixel with multiple storage units, in order to realize the simultaneous storage of multiple sets of projection patterns to facilitate subsequent image matching and other processing operations, different imaging storage units at the same position (or approximately the same position) of the image sensor can be grouped and turned on in different pattern projection periods. To this end, in the first image sensor 320_1 and the second image sensor 320_2, each pixel column or each group of pixel columns may include N pixel storage sub-columns, where N is an integer greater than or equal to 2. The synchronization device 330 can synchronously turn on one or more pixel storage sub-columns included in the pixel column(s) in the strip direction corresponding to the current scanning position in the first and second image sensors based on the scanning position of the projection device 310.

Here, "pixel storage sub-columns" refer to a subset of all storage units corresponding to all pixels in each pixel column or in each group of pixel columns, and in order to achieve accurate measurement of depth information on the entire strip projection length, the pixels corresponding to the aforementioned storage units are evenly distributed along the pixel column direction (that is, the strip length direction). That is, in the image sensor used in the disclosure, all storage units corresponding to all pixels in each pixel column or each group of pixel columns are divided into N parts, and the pixels corresponding to storage units are evenly arranged along the pixel column direction. According to different division modes, the N pixel storage sub-columns can be implemented by a single pixel column, or by a pixel column group composed of multiple adjacent pixel columns.

Thus, in the projection process of multiple strip patterns for calculating a set of depth data (for example, a set of three or five patterns illustrated in FIGS. 1 and 2), these N subsets can be turned on separately with the arrival of scanning strips under the control of the synchronization device, to collect the corresponding imaging information. In this way, when the projection of multiple strip patterns is completed, the storage units of the image sensor may simultaneously include imaging information corresponding to the multiple strip patterns. The above information can be used in subsequent depth calculations, for example, directly using the digital circuit described below to perform fast and efficient pixel matching calculations. Here, the number of N may correspond to the number of scanning patterns, that is, each time a pattern is projected by scanning, one of the N sub-columns is turned on for imaging. It can be understood that, in other embodiments, the number of N may also be greater than the number of scanning patterns. For example, each time a pattern is projected by scanning, two of the N sub-columns are turned on for imaging, or one storage sub-column is reserved for imaging of ambient light as described below. When the number of patterns included in a set of scanning patterns is more than N, the setting of imaging one pattern by one or more of the N sub-columns can be realized by splitting the scanning patterns into multiple groups for projection (which also means the subsequent multiple-group calculation).

In different implementations, different pixel storage sub-columns for each pixel column or each group of pixel columns can be realized by turning on different pixels or turning on different storage units connected to the same pixel.

In the case of dividing the storage unit of each pixel column or each group of pixel columns into N pixel storage sub-columns, since each pixel only includes one storage unit as shown in FIG. 7, the sub-column division of its storage unit can be directly realized by dividing the pixels. That is, the first image sensor 320_1 and the second image sensor 320_2 may each be divided into a plurality of pixel groups, and each pixel group is composed of M adjacent pixels, where M is an integer greater than or equal to 2, N pixel storage sub-columns of each pixel column or each group of pixel columns include sub-columns of storage units respectively corresponding to different pixels in the pixel column or each pixel group in the group of pixel columns.

Figure 9:
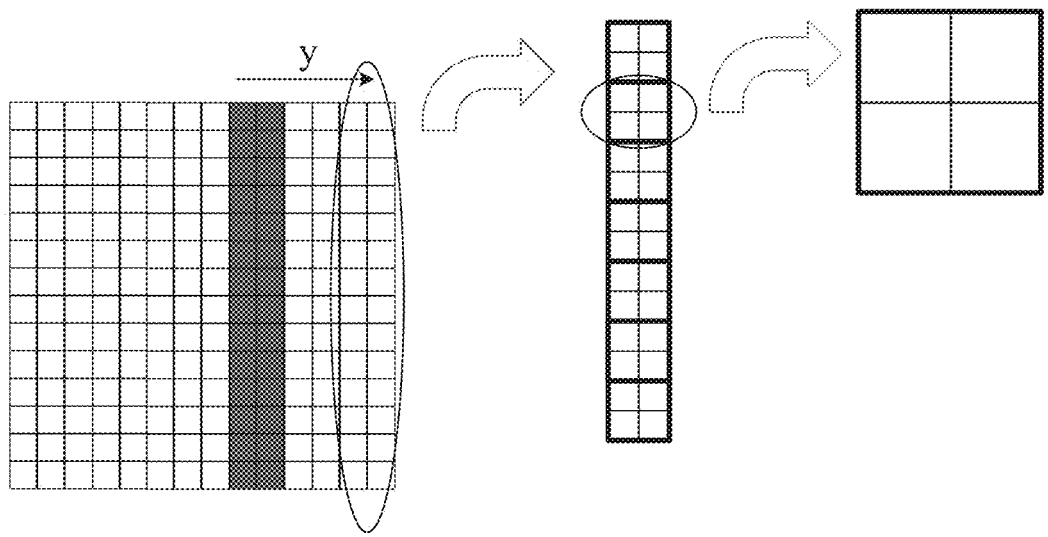
FIG. 9 shows an example of dividing pixel groups in the disclosure.

To facilitate understanding, FIG. 9 shows an example of dividing pixel groups in the disclosure. As shown in FIG. 9, the 14×14 pixels are divided into groups of pixel columns, and each group of pixel columns includes a plurality of 2×2 pixel groups (i.e., in this example, M=4). As shown by the two pixel columns in the middle of the figure, one set of pixel columns is composed of two pixel columns and includes 7 pixel groups.

Figure 10:
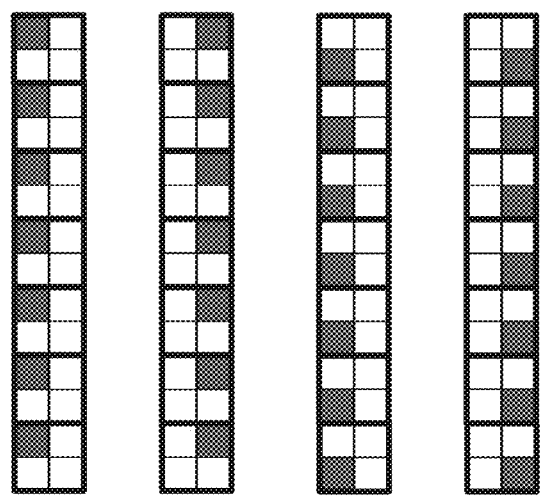
FIG. 10 shows an example of dividing pixel storage sub-columns according to the disclosure.

In the case of N=M=4, the four storage pixel storage sub-columns of the group of pixel columns may include sub-columns of storage units respectively corresponding to different pixels in each pixel group in the group of pixel columns. FIG. 10 shows an example of dividing pixel storage sub-columns according to the disclosure. As shown in FIG. 10, each pixel storage sub-column includes 7 pixels and their corresponding storage units, and the pixels included in each of them are regularly distributed in each pixel group, so that the corresponding pixels of each pixel storage sub-column are uniformly distributed in the direction of the pixel column, thereby ensuring that when each pixel storage sub-column is turned on, imaging can be performed in the entire pixel column direction.

Taking the image frame with three patterns as a group in FIG. 1 as an example, the projection device first projects the first pattern on the leftmost side in FIG. 1. During the pattern scanning process of the image sensor, the first pixel storage sub-column in the corresponding pixel column group is sequentially turned on (for example, the "upper left" pixel and its storage unit). Subsequently, the projection device projects the second pattern from the left in FIG. 1. During the pattern scanning process, the image sensor sequentially turns on the second pixel storage sub-columns in the corresponding pixel column group (for example, turn on the "upper right" pixels and their storage units in the 7 groups of pixel columns in sequence, as shown in the second pixel columns from the left in FIG. 10). Subsequently, the projection device projects the third pattern in FIG. 1. During the pattern scanning process, the image sensor sequentially turns on the third pixel storage sub-column in the corresponding pixel column group (for example, turns on the "lower left" pixels and their storage units in the 7 groups of pixel columns in sequence, as shown in the third pixel columns from the left in FIG. 10). As a result, imaging of image frames for a set of three patterns is completed.

In one embodiment, one of the N pixel storage sub-columns of each pixel column or each group of pixel columns of the first and/or second image sensor is used as the ambient light storage sub-column, and the ambient light storage sub-column is turned on during at least part of the time period when the corresponding pixel column or the group of pixel columns does not receive the structured light irradiation, so that the first and/or second image sensor generates an ambient light image frame based on the ambient light storage sub-column. Thus, the "bottom right" pixel and its storage unit shown on the rightmost side of FIG. 10 can be used as an ambient light storage sub-column to be turned on during at least part of the period when the group of pixel columns does not receive structured light irradiation, in order to generate ambient light image frame.

Therefore, in depth calculation, based on the three-valued value of the pixels in each pixel group, the pixel matching in the two image sensors can be directly performed through the equipped digital operation module. Compared with the prior art in which the image frame needs to be read frame by frame, and the processor performs pixel matching software calculation, the digital computing solution of the disclosure can greatly increase the speed of image processing, and thereby improve the depth data generation rate.

In the example of FIG. 10, the number N of the pixel storage sub-columns is the same as the number M of the pixel included in the pixel group. In other embodiments, the above-mentioned number may also be different. For example, the pixel group may be composed of 3×3 pixels (i.e., M=9), and the number of pixel storage sub-columns N may be 3. That is, three pixels in each pixel group can be connected to one pixel storage sub-column. In addition, although each pixel storage sub-column should include sub-columns of storage units corresponding to different pixels in each pixel group in the group of pixel columns, each pixel group in each pixel group is connected to the same pixel storage sub-column. The pixels need not be in the same position in the pixel group. In other words, although FIG. 10 shows that the included pixels belong to the four pixel storage sub-columns at the upper left, upper right, lower left, and lower right positions in the pixel group for the convenience of example, in other embodiments, the same pixel storage sub-columns can select pixels at different positions in different pixel groups, as long as the same pixel is not repeatedly selected between each pixel storage sub-column.

In the implementation of multiple storage units, each pixel of the first image sensor 120_1 and the second image sensor 120_2 may include M storage units as shown in FIG. 8, where M is an integer greater than or equal to 2, and N pixel storage sub-columns of each pixel column or each group of pixel columns include different storage unit sub-columns respectively corresponding to the pixel column or the group of pixel columns. Therefore, different from the scheme of grouping pixels and turning them on separately as shown in FIGS. 9 and 10, in the multi-storage unit implementation scheme, each pixel in the corresponding pixel column can be turned on, but in different scanning patterns, the different storage unit of the pixel is turned on.

In the above embodiment, the scanning position of the projection device is detected, and the imaging position of the image sensor is synchronized with the scanning position. In other words, it is a solution to control the image sensor to synchronize with the position of the strip projected by the scanning device.

In the disclosure, a scheme of controlling the projection device to synchronize its scanning position with the imaging position of the image sensor can also be implemented. At this time, the synchronization device 330 is also connected to the projection device 310 and the image sensor 320 respectively, so as to realize the accurate synchronization of the projection device 310 based on the image sensor 320. Specifically, the image sensor 320 can turn on pixel column imaging by column(s), and is used to photograph the capture area to obtain image frames illuminated by the structured light; the synchronization device 330 can control the scanning position of the projection device, so that the position of the strip currently projected by the projection device and the imaging position of the pixel column currently turned on by the image sensor at least partially overlap. Therefore, controlling the scanning device to realize the synchronization between the turned on pixel column and the scanning strip, so as to at least partially filter out the influence of ambient light.

In one embodiment, the image sensor 320 used in the disclosure may be a conventional rolling-shutter image sensor. The rolling image sensor 320 works in a trigger mode, and the imaging window composed of currently turned on pixel columns moves column by column in a predetermined direction.

As shown in FIG. 3, the current strip is scanning to the center of the capture area. For this reason, in the image sensor 320, pixel column(s) (for example, three adjacent pixel columns) located in the central area is turned on for imaging. As the strip moves in the y direction (as shown by the arrow in the lower perspective view of FIG. 3), the pixel columns that are turned on for imaging in the image sensor 320 also move synchronously (as shown by the arrow above the matrix in the upper left block diagram of FIG. 3). As a result, the one-dimensional characteristics of the strip image can be used to control the range of the pixel column for imaging at each moment, thereby reducing the adverse effect of ambient light on the measurement result. In order to further reduce the influence of ambient light, the projection device is particularly suitable for projecting light that is not easily confused with ambient light, such as infrared light. In addition, since the corresponding relationship between the pixel column and the scanning light is affected by many factors such as the width, power, speed of the projected light, and the light-sensing efficiency of the image sensor, the range of the pixel column and the corresponding number (that is, the setting of the imaging window) can be determined based on, for example, the calibration operation. In the trigger mode of the rolling sensor, the specific exposure time of the imaging window is determined by the number of simultaneously turned on pixel columns contained in the imaging window.

In a conventional rolling image sensor, the exposure time of a single column and the overall exposure time of a single image frame are fixed (or, only a few levels are available). Thus, the exposure time of the imaging window can be determined according to the total number of columns of row-by-row exposure (or the total number of rows of the rotated row exposure sensor, the same below). For example, for a 1000×1000 image sensor, the single frame exposure time is 10 ms, and the exposure time of each column is 10 μs. In this case, if the imaging window width is set to 200 in the trigger mode, the imaging time of the imaging window is 2 ms, and it moves to one side at a speed of 10 μs.

Thus, the synchronization device 330 can control the movement speed of the strip projected by the projection device 310 in the capture area to be the same as the movement speed of the imaging window corresponding to the imaging position in the capture area. Further, the synchronization device 330 can also control the initial movement position of the strip projected by the projection device in the capture area to be at least partially located within the initial imaging range corresponding to the imaging window in the capture area.

As mentioned above, if the width of the imaging window is too wide, the ambient light that can be filtered out by the scan and column exposure synchronization will be reduced, and the imaging signal-to-noise ratio will be reduced. If the width of the imaging window is too narrow, although more ambient light can be filtered out, it may not be possible to obtain all the projected structured light information in the window due to reasons such as insufficient width redundancy. In addition, in the case of using a conventional rolling image sensor, the width of the imaging window also needs to consider the overall exposure time of the imaging window.

For this reason, in one embodiment, a narrower imaging window can be used through multiple projections and exposures to obtain a higher signal-to-noise ratio. The projection device 310 scans and projects structured light of the same pattern to the capture area in N imaging frame periods. The synchronization device 330 is used to shift the initial imaging window of the image sensor by a width of the imaging window in the predetermined direction in each period of the N imaging frame periods, so that the N image frames captured by the image sensor in the N imaging frame periods are used to synthesize one image frame. At the same time, the initial projection position of the projection device remains unchanged in each period. For example, in the implementation of a conventional wide imaging window, the window width is set to 200, and an exposure from left to right is performed. Under the control of the synchronization device, the projection device also performs a strip light scan from left to right, thereby obtaining an image frame. In order to improve the signal-to-noise ratio, the window width is set to 100, and two exposures are made from left to right. The first exposure starts from column 0-100, and the second exposure starts from column 101-200. The projection device 310 performs exactly the same scan in two exposures (the initial projection position is the same, and the traveling speed is the same). Two image frames are thus obtained, and the two image frames can be combined to obtain all the strip light information while reducing the ambient light entering during the exposure process, thereby improving the signal-to-noise ratio.

The synchronization device can control the reciprocating frequency and start time of the reflecting device in the projection device, so that the position of the strip currently projected by the projection device and the imaging position of the pixel column currently turned on by the image sensor at least partially overlap.

In one embodiment, the reflecting device may include: a mechanical rotating mirror reciprocating at a predetermined frequency for projecting the line-shaped light in a scanning manner to the capture area at a predetermined frequency, wherein the length direction of the line-shaped light is the length of the projection strip. For example, the synchronization device may control the angle and rotation speed of the mechanical rotating mirror through voltage and current, so that the position of the strip currently projected by the projection device and the imaging position of the pixel column currently turned on by the image sensor at least partially overlap.

Figure 11:
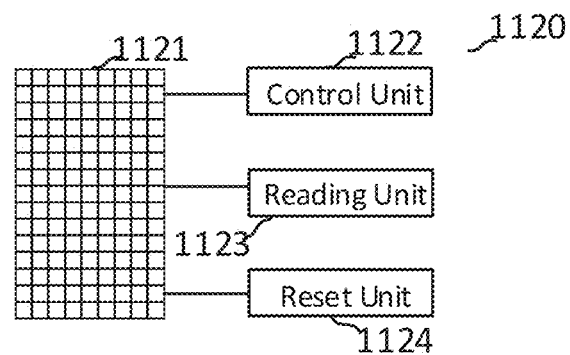
FIG. 11 shows a schematic diagram of the configuration of an image sensor according to an embodiment of the disclosure.

In one embodiment, the image sensor of the disclosure can be implemented as an image sensor with a special structure, and is particularly suitable for shooting HDR images. FIG. 11 shows a schematic diagram of the configuration of an image sensor according to an embodiment of the disclosure. As shown in FIG. 11, the image sensor 1120 includes a pixel array 1121 for imaging, a control unit 1122 for controlling the exposure of the pixel array, a reading unit 1123 for reading the exposure signal of the pixel array, and a reset unit 1124 for resetting the pixel array.

The pixel array includes a plurality of pixel units. For example, in an image sensor with a resolution of 1000× 1000, the pixel array may include 1000,000 pixel units. Each pixel unit may include a photosensitive component and a storage component. The pixel unit may have a configuration as shown in FIG. 7 or 8.

The control unit 1122 can turn on the switch of the corresponding pixel, so that the charge converted by the photodiode can be stored by the storage component to realize the exposure of the pixel. The reading unit 1123 can read the exposure signal in each storage component. The reset unit 1124 can be used to reset the signal in the storage component. It should be understood that the control unit 1122, the reading unit 1123, and the reset unit 1124 need to be connected to each pixel unit. However, according to different application scenarios, the operation of the pixel array 1121 can be based on the whole, row by row, column by column, or even pixel by pixel.

The image sensor of the disclosure has the characteristics of accumulating exposure time and reading exposure information multiple times during the accumulated exposure time. Thus, the control unit 1122 can control the exposure of the pixel unit in at least a part of the predetermined time period, and the reading unit 1123 can read the accumulated exposure signals of the storage component in the predetermined time period multiple times, for example, N times, where N is an integer greater than or equal to 2. The reset unit 1124 can make the storage unit not be reset within a predetermined period of time. Thus, through cumulative exposure and multiple readings, the exposure time can be effectively reused, the framing efficiency is improved, and the dynamic target can be accurately captured.

Figure 12:
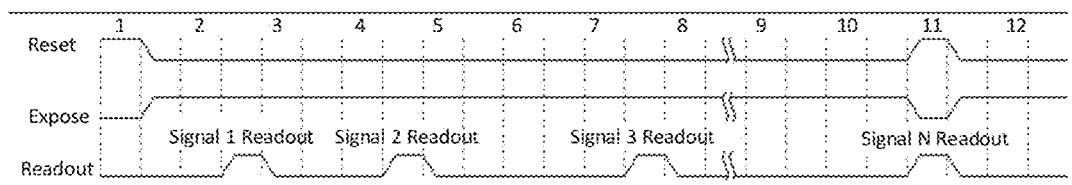
FIG. 12 shows an example of a timing chart of the operation of the image sensor of the disclosure.

FIG. 12 shows an example of a timing diagram of the operation of the image sensor of the disclosure. As shown in FIG. 12, each pixel of the image sensor pixel array may be continuously exposed for a predetermined time period of t2-t10 under the control of the control unit 1121. Therefore, the storage component included in each pixel unit can be continuously exposed during the time period t2-t10. The reading unit reads the exposure signal of the storage component in the predetermined time period of t2-t10 multiple times, signal 1, signal 2, signal 3 . . . signal N readout as shown in the figure. The reset unit 1124 can make the storage component not be reset within a predetermined period of time. As shown in the figure, the reset unit 1124 only resets the exposure signal at time t11. Thus, the exposure signals 1-N obtained by reading N times in each pixel unit include the exposure signals accumulated by the pixel in the gradually increasing exposure time. That is, the brightness of signal 1, signal 2, signal 3 . . . signal N readout for a certain pixel unit gradually increases as the exposure time increases. The above-mentioned respective signals with different exposure intensities can be used to obtain image frames.

It should be understood that the timing diagram shown in FIG. 12 may be a timing diagram of a single or multiple pixel units, a single or multiple pixel columns (or rows), or an entire pixel array. In the case of full-frame exposure, since each pixel unit is exposed at the same time, the timing diagram of FIG. 5 can reflect the operation timing for each pixel unit. In the case of rolling shutter exposure, since the exposure is performed row by row, the timing diagram of FIG. 12 can reflect the operation timing of a certain row of pixel units. At this time, the timing diagrams of the other rows are similar to those in FIG. 12, but the specific operation moments are shifted on the time axis. In addition, in the case where each pixel unit of the image sensor can be operated separately, the timing diagram of FIG. 5 can at least reflect the operation timing of some pixel units, and/or the operation timing of other pixel units is similar to that shown in FIG, but there will be differences in specific operating moments.

In different application scenarios, the control unit 1122 may, as shown in FIG. 12, control the pixel unit to continuously expose for a predetermined period of time, and the reading unit 1123 performs multiple readings of the exposure signal of the storage component within a predetermined period of time with the same or different intervals. In addition, the control unit 1122 can also control multiple exposures of the pixel unit within a predetermined period of time, and the reading unit 1123 can perform corresponding multiple readings of the exposure signal of the storage component within the predetermined period of time. In the above embodiment of multiple exposure and multiple reading, the control unit 1122 and the reading unit 1123 can be implemented by a fixed exposure and read execution module. For example, the exposure and read can be implemented as a pipeline to improve operation efficiency.

In one embodiment, the predetermined period of time is an image frame period, and the image frame period includes N imaging stages. That is, the period between two reset signals can be regarded as one image frame period. The control unit 1122 may control the pixel unit to be exposed for at least a part of the time period in each imaging stage, so that the storage component accumulates the exposure signals in the N imaging stages. The reading unit 1123 can read the exposure signal in the storage component once for each imaging stage. Further, the reading unit 1123 reads the signals in the storage component in each imaging stage, and the obtained exposure signals of the N groups of pixel arrays can be used to synthesize one image frame. As a result, through the staged exposure and multiple readings within one image frame, the subject information reflected by each pixel can be obtained more comprehensively.

Figure 13:
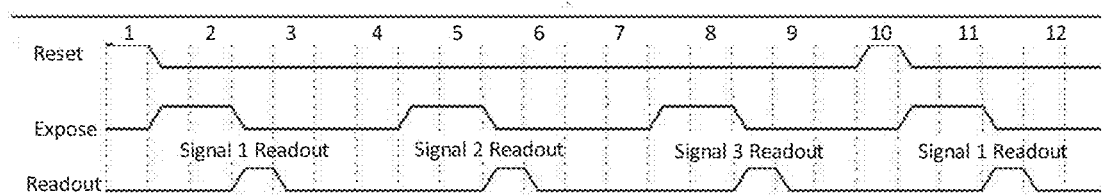
FIG. 13 shows another timing chart example of the operation of the image sensor of the disclosure.

FIG. 13 shows another timing diagram example of the operation of the image sensor of the disclosure. As shown in the figure, part or all of the pixel units in the pixel array can be exposed to three times at t2, t5, and t8 in the image frame period of t2-t9 under the control of the control unit 1122, the reading unit 1123 reads the signal 1, the signal 2 and the signal 3 after each exposure, and the reset unit 1124 resets the pixel unit at t10. After the pixel array is reset, imaging of the next image frame period starts. That is, a new round of readout of signal 1, signal 2, and signal 3 is started.

Thus, in one image frame period, three groups of exposure signals with successively longer exposure times (their brightness become larger in turn) can be obtained, and these signals can be used for the synthesis of one image frame. For each pixel unit, one or more pixel signals whose brightness conforms to a predetermined rule are selected from the N pixel signals for synthesis of the image frame. For example, it is possible to select the signal within the predetermined brightness value range or the closest to the intermediate brightness value among the N pixel signals to be selected for the synthesis of the image frame, thereby obtaining an image that can better reflect the information of the captured object.

Based on different standards, selection can be made from N signals obtained for each pixel unit to obtain the final brightness value used to synthesize the image frame. Therefore, the predetermined rule for selecting the pixel signal may include at least one of the following: selecting a pixel signal with the brightness value within a predetermined brightness value range from N pixel signals; select a pixel signal with the brightness value closest to the intermediate brightness value from the N pixel signals; select a pixel signal with the brightness value that is closest to the brightness saturation region but has not yet entered the brightness saturation region from the N pixel signals.

For example, the brightness value that is too bright or too dark can be filtered out; a value close to the middle brightness can be selected; the average value of multiple values within a predetermined brightness value range can be obtained; or the value obtained in the nth round of N stages can be preferred. For example, when the brightness value range is 0 to 255, it can be specified to filter out the values below 50 and above 200, and select the moderate brightness value within the predetermined brightness value range. In the case that there are still multiple values after filtering, the value closest to the intermediate brightness value 127 can be chosen; take the average of the multiple values; or preferably select a certain round of values (for example, the third stage of brightness is preferred value). In addition, when the N values are all less than 50 or greater than 200, the signal closest to the intermediate brightness value is selected from them. For example, the signal brightness of the three imaging stages of a certain pixel are 5, 20, and 44 respectively. Since the brightness value of no signal is greater than the threshold value of 50, the brightest value 44 is selected as the brightness value of the pixel in the composite image frame.

In addition, since the brightness saturation curve in image sensor imaging is usually S-shaped, the brightness signal whose brightness value is closest to the brightness saturation region but does not enter the saturation region can be selected. In a specific operation, a pixel whose ratio of the brightness value P0 to the exposure time value T0 is less than the predetermined saturation slope threshold and has the greatest brightness can be selected as the brightness value on the pixel point. In this way, it is possible to obtain an image frame with the largest brightness and no saturated pixels that are too bright.

In one embodiment, the control unit 1122 may control each pixel column or pixel row in the pixel array to turn on the exposure within a fixed period of time in each imaging stage (The following will be described in detail in conjunction with an embodiment of depth measurement). As a result, the image sensor of the disclosure is particularly suitable for application scenarios that require column or row synchronization with the capture object. Similarly, each pixel unit may include M storage components, and each storage component is used to store the exposure signal of one image frame period of the M image frame periods, where M is an integer greater than or equal to 2. Thus, the image sensor of the disclosure can store multiple image frames at the same time.

The image sensor 1120 may have the structure shown in FIG. 8, that is, each pixel unit may include M storage components, and each storage component is used to store the exposure signal of one image frame period of the M image frame periods. Thus, the image sensor 1120 can store M image frames at the same time. In a preferred embodiment, the measuring head may also include a digital operation module, which directly performs digital operations on the M exposure signals stored in each pixel unit after generating the set of M image frames, in order to perform pixel matching.

The disclosure herein also discloses a measurement device using the above measuring head. Specifically, a depth data measurement device may include the depth data measuring head as described above, and a processor connected to the depth data measuring head. The processor is used for determining the depth data of the capture object in the capture area according to the predetermined relative positions of the first and second image sensors and the first and second two-dimensional image frames obtained by imaging the structured light. In different embodiments, the measuring head may have a relatively independent package, or it may be packaged in the measurement device together with the processor.

Figure 14:
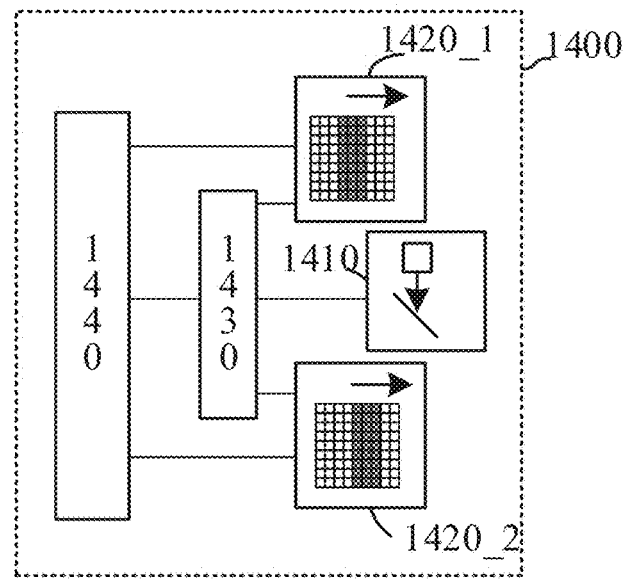
FIG. 14 shows a schematic diagram of a depth data measurement device according to an embodiment of the disclosure.

FIG. 14 shows a schematic diagram of a depth data measurement device according to an embodiment of the disclosure. As shown in the figure, the measurement device 1400 may include the measuring head as described above and the processor 1440. The measuring head includes a projection device 1410, two image sensors 1420, and a synchronization device 1430.

The processor 1440 is connected to the measuring head, for example, connected to each of the projection device 1410, the two image sensors 1420, and the synchronizing device 1430, and is configured to determine the depth data of the photographing object in the capture area according to the predetermined relative positions of the first and second image sensors 1420_1 and 1420_2 and the first and second two-dimensional image frames obtained by imaging the structured light.

In one embodiment, at least part of the synchronization function of the synchronization device may be implemented by the processor. For example, the processor can determine the scanning position of the strip in real time based on the data measured by the measurement instrument included in the synchronization device, and incorporate the synchronization function of the synchronization device to achieve synchronization control of various components, for example, directly based on the delay-free electric signal.

Figure 15:
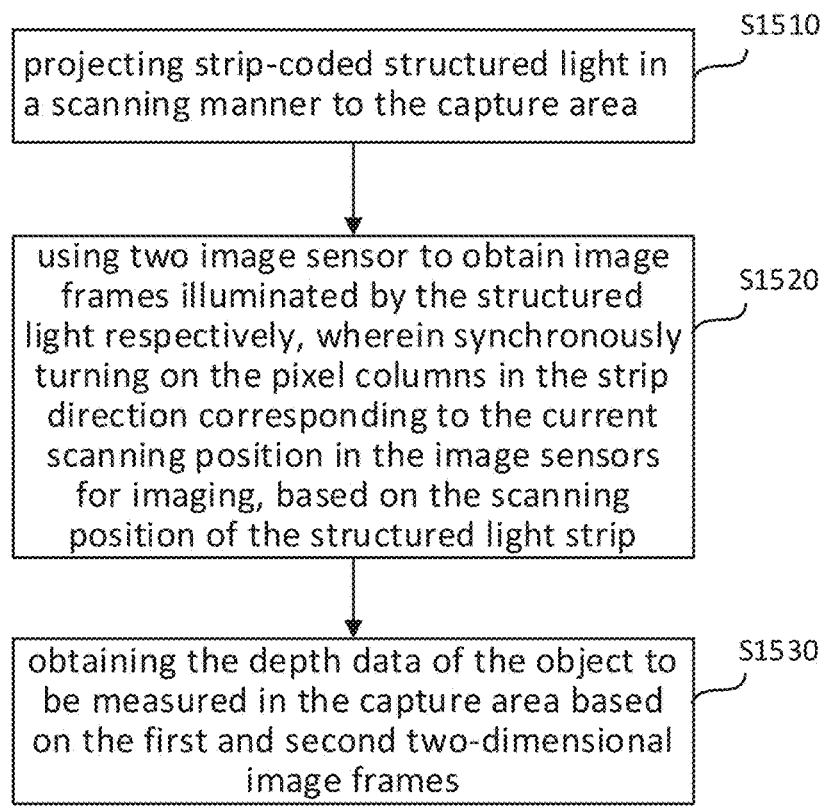
FIG. 15 shows a schematic flowchart of a depth data measuring method according to an embodiment of the disclosure.

FIG. 15 shows a schematic flowchart of a depth data measuring method according to an embodiment of the disclosure. The method can be implemented by the depth data measuring head and the measurement device of the disclosure.

In step S1510, strip-coded structured light is projected to the capture area in a scanning manner. In step S1520, the first and second image sensors having a predetermined relative positional relationship are used to photograph the capture area to obtain the first and second two-dimensional image frames illuminated by the structured light, respectively. Based on the scanning position of the strip, the pixel column(s) in the strip direction corresponding to the current scanning position in the first and second image sensors are simultaneously turned on for imaging. In step S1530, the depth data of the measured object in the capture area is obtained based on the first and second two-dimensional image frames.

In one embodiment, step S1510 may include using a laser emitter to generate infrared line-shaped light; and using a micromirror device to vibrate reciprocally at a predetermined frequency, so as to scan and project the line-shaped laser to the capture area at the predetermined frequency, wherein the length direction of the line-shaped laser is the length direction of the projection strip.

In a parallel scheme, s depth data measurement scheme in which the projection device is controlled can be realized d. At this time, the method includes first, scanning and projecting strip-coded structured light to the capture area. Secondly, the image sensor turns on the pixel column by column to perform imaging, and photographs the capture area to obtain an image frame illuminated by the structured light, wherein the scanning position of the projection device is controlled so that the position of the strip currently projected by the projection device and the imaging position of the pixel column currently turned on by the image sensor can at least partially overlap.

Repeat the above steps to sequentially project a group of strip-coded structured lights of different patterns, and make the image sensor image a group of strip-coded structured lights of different patterns and generate a set of image frames for different patterns. For example, a set of image frames composed of three or five patterns as shown in FIG. 1 or FIG. 2 respectively. Therefore, the depth data of the object to be measured in the capture area can be obtained based on the set of image frames. At this time, the reflecting device of the projection device can be realized by a mechanical rotating mirror that is easy to control.

The depth data measuring head, measurement device and measuring method according to the disclosure have been described in detail above with reference to the accompanying drawings. The depth data measurement scheme of the disclosure can combine actively projected strip-coded structured light and binocular imaging, and rely on the superimposable characteristics of strip-coded patterns and the characteristics of binocular imaging that do not depend on a specific imaging plane, and thus provides a highly flexible pixel-level depth imaging solution. Specifically, the disclosure can also remove the influence of ambient light on the depth measurement results through the high synchronization of imaging and scanning, and use DMD to achieve high-speed scanning of line-shaped light, thereby further expanding the available scenes of the disclosure and improving imaging speed and accuracy.

The flowcharts and block diagrams in the accompanying drawings show the possible implementation architecture, functions, and operations of the system and method according to multiple embodiments of the disclosure. In this regard, each block in the flowchart or block diagram may represent a module, program segment, or part of the code, and the module, program segment, or part of the code contains one or more executable instructions for implementing the specified logic function. It should also be noted that in some alternative implementations, the functions marked in the blocks may also occur in a different order than marked in the drawings. For example, two consecutive blocks can actually be executed substantially in parallel, or they can sometimes be executed in the reverse order, depending on the functions involved. It should also be noted that each block in the block diagram and/or flowchart, and the combination of the blocks in the block diagram and/or flowchart, can be implemented by a dedicated hardware-based system that performs the specified functions or operations or it can be realized by a combination of dedicated hardware and computer instructions.

The embodiments of the disclosure have been described above, and the above description is exemplary, not exhaustive, and is not limited to the disclosed embodiments. Without departing from the scope and spirit of the described embodiments, many modifications and changes are obvious to those of ordinary skill in the art. The choice of terms used herein is intended to best explain the principles, practical applications, or improvements to the technology in the market of the embodiments, or to enable those of ordinary skill in the art to understand the embodiments disclosed herein.

What is claimed is:

1. A depth data measuring head, including:
   a projection device configured to project strip-coded structured light in a scanning manner to the capture area;
   first and second image sensors having a predetermined relative positional relationship, configured to capture the capture area respectively to obtain the first and second two-dimensional image frames illuminated by the structured light, wherein in the first and the second image sensors, each pixel in the image sensor includes a plurality of structured light image frame storage units, or each pixel column or each group of pixel columns includes N pixel storage sub-columns, where N is an integer greater than or equal to 2, and each structured light image frame storage unit or pixel storage sub-column is respectively used to image a different pattern of strip-coded structured light sequentially projected by the projection device to generate a set of image frames of different patterns;
   a synchronization device configured to synchronously turn on the pixel columns in the strip direction corresponding to the current scanning position in the first and the second image sensors for imaging, based on the scanning position of the projection device; and
   a digital arithmetic module configured to perform pixel matching in the first and the second image sensors on the set of image frames of different patterns for one depth data calculation.

2. The measuring head according to claim 1, wherein the number of pixel columns to be turned on each synchronization is determined based on the calibration operation.

3. The measuring head according to claim 1, wherein each of the image sensors completes imaging of one image frame after each predetermined number of scanning projections performed by the projection device.

4. The measuring head according to claim 1, wherein the structured light image frame storage unit or storage unit is a binary memory storing 0 or 1 value, and after generating the set of image frames, directly based on the multiple values of 0 or 1 stored in each pixel to perform pixel matching between the first and second image sensors.

5. The measuring head according to claim 1, wherein the structured light image frame storage unit or storage unit is a multi-level memory for storing gray values, and the measuring head further comprises a digital operation module, and after the set of image frames are generated, the digital operation module directly performs digital operations on the gray value stored in each pixel to perform pixel matching between the first and second image sensors.

6. The measuring head according to claim 1, wherein each pixel in the image sensor further includes an additional storage unit, or one of the N pixel storage sub-columns is used as an ambient light storage sub-column,
   the additional storage unit or the ambient light storage sub-column is used to turn off when at least one structured light image frame storage unit of the pixel is turned on, and turn on at least part of the time period when the structured light is not irradiated, so that the image sensor generates an ambient light image frame based on the additional storage unit or the ambient light storage sub-column.

7. The measuring head according to claim 1, wherein the synchronization device includes a measurement instrument for measuring the scanning position of the projection device, and based on the measurement result of the measurement instrument, synchronizes the turn on of the pixel column imaging.

8. The measuring head according to claim 1, wherein the projection device comprises:
   a laser generator, for generating line-shaped and/or infrared lasers, and the laser generator performs high-speed switching to project bright and dark structured light corresponding to the strip code in a scanning manner.

9. The measuring head according to claim 8, wherein the projection device comprises:
   a light-emitting device, configured to generate line-shaped light; and
   a reflecting device, configured to reflect the line-shaped light, in order to project the line-shaped light moving in the vertical direction of the strip direction to the capture area, and the reflecting device includes one of the following:
   a mechanical rotating mirror reciprocating at a predetermined frequency, configured to project the line-shaped light to the capture area at the predetermined frequency in a scanning manner, wherein the length direction of the line-shaped light is the length direction of the projection strip;
   a micromirror device reciprocatingly vibrating at a predetermined frequency, configured to project the line-shaped light to the capture area at the predetermined frequency in a scanning manner, wherein the length direction of the line-shaped light is the length direction of the projection strip.

10. The measuring head according to claim 9, wherein the synchronization device includes a measurement instrument for real-time measurement of the vibration phase of the micromirror device, and based on the measurement result of the measurement instrument, synchronizes the turn on of the pixel column imaging.

11. The measuring head according to claim 1, wherein the image sensor comprises:
    a pixel array, the pixel array includes a plurality of pixel units, and each pixel unit includes a photosensitive component and a storage component;
    a control unit configured to control the exposure of the pixel units;
    a reading unit configured to read the exposure signal in the storage component; and
    a reset unit configured to reset the signal in the storage component,
    wherein, the control unit controls the exposure of the pixel unit in at least a part of the predetermined time period, and the reading unit reads the accumulated exposure signal of the storage component in the predetermined time period N times, wherein, N is an integer greater than or equal to 2, and the reset unit prevents the storage component from being reset within the predetermined time period.

12. A depth data measurement device, including:

the depth data measuring head according to claim 1, and a processor connected to the depth data measuring head, configured to determine depth data of the capture object in the capture area, according to the predetermined relative positions of the first and second image sensors and the first and second two-dimensional image frames obtained by imaging the structured light.

13. A depth data measuring method, including:

projecting strip-coded structured light in a scanning manner to the capture area;

using a first image sensor and a second image sensor having a predetermined relative positional relationship to photograph the capture area respectively, in order to obtain the first and second two-dimensional image frames illuminated by the structured light, wherein synchronously turning on the pixel columns in the strip direction corresponding to the current scanning position in the first and second image sensors for imaging, based on the scanning position of the structured light strip;

using a plurality of structured light image frame storage units included in each pixel in each image sensor or N pixel storage sub-columns included in each pixel column or each group of pixel columns to respectively capture strip-coded structured lights of different patterns projected in sequence in the first and the second image sensors to generate a set of image frames each for a different pattern; and performing pixel matching in the first and the second image sensors on the set of image frames of different patterns for one depth data calculation, to obtain the depth data of the object to be measured in the capture area.

14. The method according to claim 13, wherein projecting strip-coded structured light in a scanning manner to the capture area comprises:

using a laser transmitter to generate infrared line-shaped light; and using a micromirror device or a mechanical rotating mirror to vibrate back and forth at a predetermined frequency, in order to project the line-shaped laser light to the capture area at the predetermined frequency in a scanning manner, wherein the length direction of the line-shaped laser light is the length direction of the projection strip.

* * * * *